United States Patent [19]

Groendal et al.

[11] Patent Number: 4,792,150
[45] Date of Patent: Dec. 20, 1988

[54] BICYCLE FRAME

[75] Inventors: Mark L. Groendal, Kentwood, Mich.; Robert E. Shook, Huntington Beach, Calif.

[73] Assignee: Greendale Bicycle Company, Grand Rapids, Mich.

[21] Appl. No.: 54,270

[22] Filed: May 26, 1987

[51] Int. Cl.$^4$ .............................................. B60K 9/00
[52] U.S. Cl. .................................. 280/275; 280/283; 280/281 R
[58] Field of Search ...................... 280/281, 275, 283; 138/172, 116, 115

[56] References Cited

U.S. PATENT DOCUMENTS

| | | |
|---|---|---|
| 433,172 | 7/1890 | Jett . |
| 441,649 | 12/1890 | Dunlop . |
| 453,514 | 6/1891 | Shier . |
| 463,710 | 11/1891 | Mathews . |
| 591,306 | 10/1897 | Tolson . |
| 602,034 | 5/1898 | Murphy . |
| 701,967 | 6/1902 | Titus . |
| 908,127 | 12/1908 | Passmore ............................ 138/172 |
| 1,045,025 | 11/1912 | Heroguez . |
| 1,377,948 | 5/1921 | Wacker ............................... 280/275 |
| 3,990,717 | 11/1976 | Best . |
| 4,102,439 | 7/1978 | Calderazzo ............................ 188/24 |
| 4,119,326 | 10/1978 | Porter .................................. 280/236 |
| 4,162,797 | 7/1979 | McBride ............................... 280/275 |
| 4,202,561 | 5/1980 | Yonkers ................................ 280/278 |

FOREIGN PATENT DOCUMENTS

| | | |
|---|---|---|
| 110943 | 5/1928 | Fed. Rep. of Germany . |
| 839312 | 3/1939 | France . |
| 12901 | 9/1986 | United Kingdom . |

*Primary Examiner*—John J. Love
*Assistant Examiner*—Donn McGiehan
*Attorney, Agent, or Firm*—Price, Heneveld, Cooper, DeWitt & Litton

[57] ABSTRACT

A bicycle frame has front and rear frame portions interconnected at their top by a flexible spring connection, that allows relative vertical flexing of the frame portions, and by a tension cable and compression spring between a forward portion of the front frame portion and a lower portion of the rear frame portion. Integral stiffening means included with the vertical center post member of the rear frame portion and with the horizontal crossbar assembly of the front frame portion are provided to minimize the tendency of the front portion of the frame to yaw laterally from side to side relative to the rear frame.

18 Claims, 3 Drawing Sheets

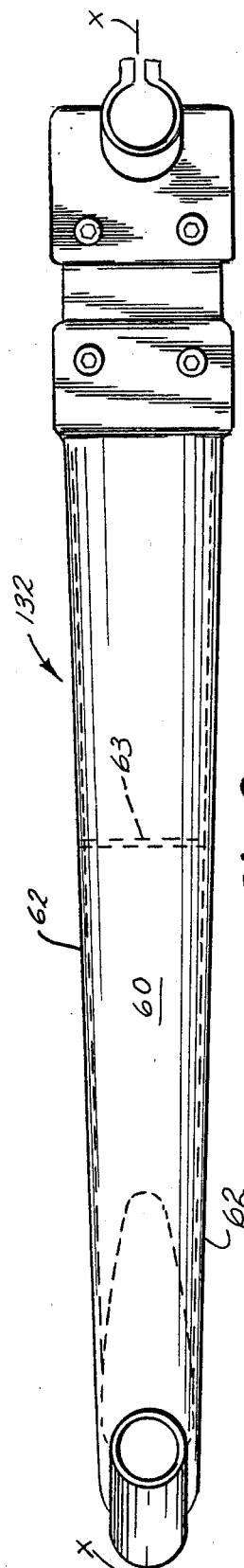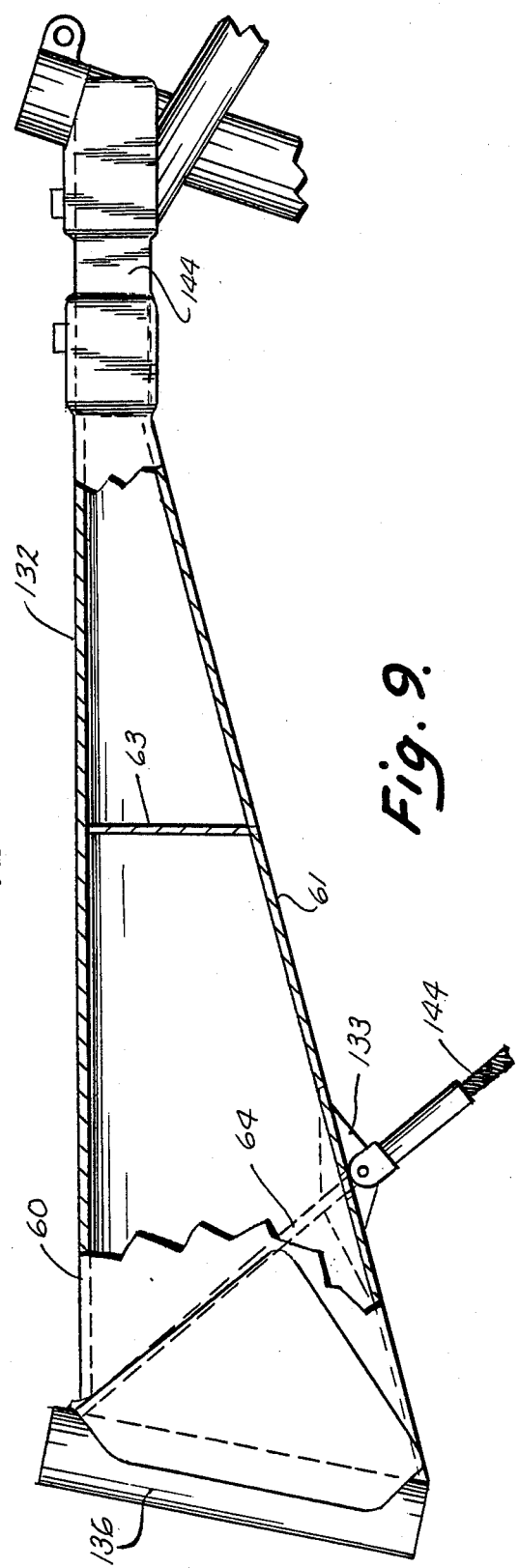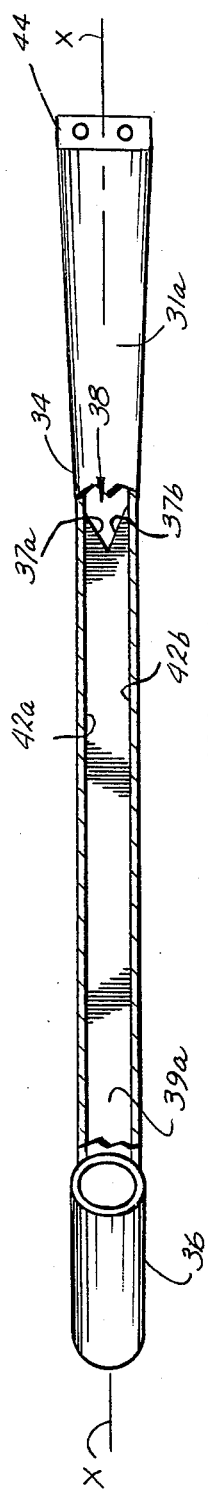

BICYCLE FRAME

BACKGROUND OF THE INVENTION

The present invention relates to a revolutionary new type of bicycle invented by myself and disclosed and claimed in my copending U.S. patent application Ser. No. 266,181, filed May 22, 1981, now U.S. Pat. No. 4,669,747. Conventional bicycles comprise a rigid frame including a central post in which a seat is mounted, a top crossbar rigidly connected to the central post near the top thereof and extending forwardly to a front journal tube in which the separate front wheel frame, or fork, is rotatably journaled, and a bottom crossbar which extends upwardly and forwardly from the bottom of the center post, usually from the crank shaft hub mounted at the bottom of the central post, to the front journal hub at a point just below the top crossbar. The center post, top crossbar and bottom crossbar define the three legs of a rigid structural triangle.

In the revolutionary new bicycle of my invention, the foregoing rigid, triangular-shaped frame member is eliminated. I eliminate the bottom crossbar altogether and provide for a flexible spring connection between the top crossbar and the center post. One or more tension cables extend from the front portion of the frame, near the front of the top crossbar, downwardly to a point on the rear portion of the frame near the bottom of the center post. This construction is especially well adapted to dirt bike racing in that the frame itself is designed to absorb the shocks of rough riding. Further, when pedalling torque spreads the frame, the springs at the tension cable ends are compressed. At the end of the pedal stroke, the spring relaxes and drives the crank upward for an extra kick when the pedals are on the upstroke part of their travel.

One problem with this construction is that the front portion of the frame and the front wheel tend to yaw laterally from side to side relative to the rear frame portion as the bicycler pedals. Heretofore, I have solved this problem by using a wider flat spring at the junction between the crossbar and the center post. While this solution has been somewhat satisfactory, it has not eliminated the yawing action completely and it makes the bicycle less attractive due to the appearance of the relatively wide flat spring and the flat spring housings.

SUMMARY OF THE INVENTION

Surprisingly, I have been able to solve the front yaw problem and even use a narrower, more compact flat spring at the juncture of the front and rear frame portions by including stiffening means integrally with the bicycle center post and/or the crossbar. Even though the logical place to expect yawing to occur would be the flexible interconnection between the front and rear frame portions, past efforts to stiffen the flat spring were not nearly as effective in eliminating the yaw problem as providing integral stiffening for the center post and/or crossbar.

Most preferably, the stiffening means for the center post comprises a flat, rigid plate positioned inside the center tube and extending a major portion of the distance from the bottom to top thereof and oriented laterally with respect to the longitudinal axis of the frame. In one embodiment, the crossbar includes a pair of vertically spaced crossbar members and the stiffening means for the crossbar comprises a flat, rigid plate positioned inside each crossbar member and extending a major portion of the length thereof and oriented laterally with respect to the longitudinal axis of the frame. In another embodiment, the stiffening means for the crossbar comprises the crossbar being constructed of substantially flat, consecutively connected wall portions formed into a box-beam.

These and other objects, advantages and features of the present invention will be more fully understood and appreciated by reference to the written specification and appended drawings.

BRIEF DESCRIPTION OF THE DRAWINGS

FIG. 4 is a sectional plan view taken along the lines IV—IV in FIG. 2;

FIG. 8 is a top plan view of an alternative embodiment of the invention; and

FIG. 9 is a partially-sectioned side elevational view of the embodiment shown in FIG. 8.

DESCRIPTION OF THE PREFERRED EMBODIMENT

Figure 1:
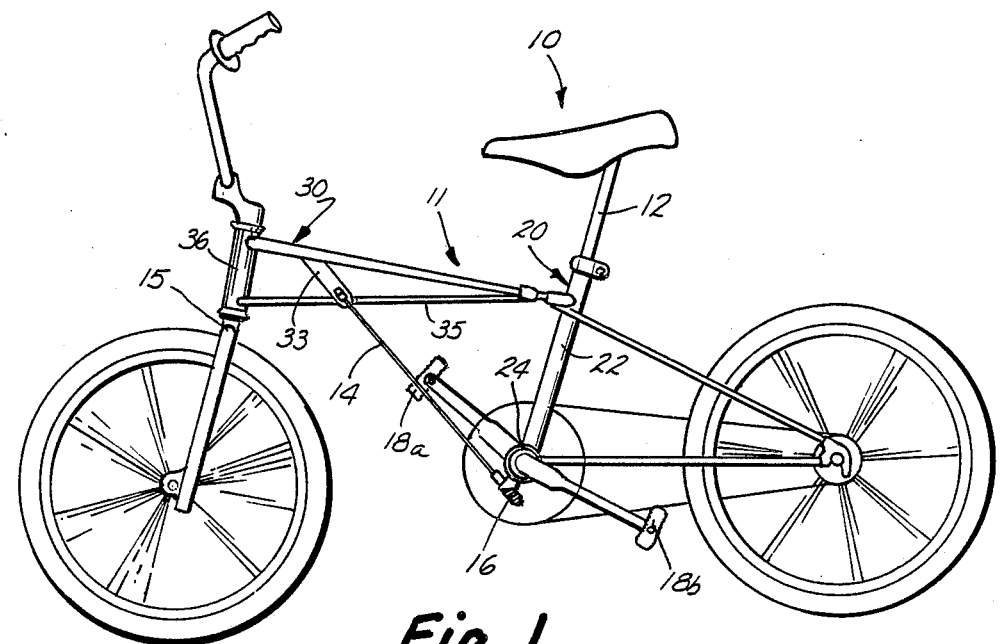
FIG. 1 is a side elevational view of a flexible bicycle of my invention.
Figure 2:
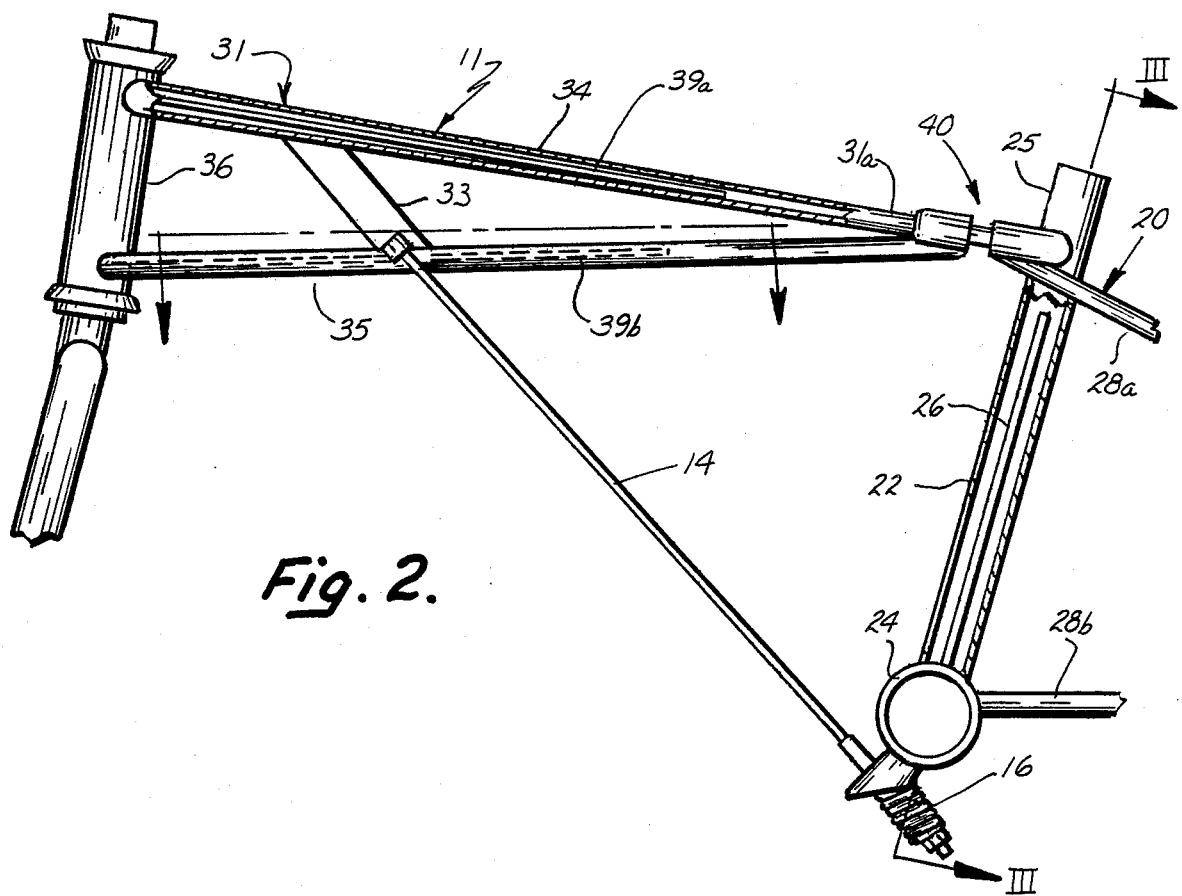
FIG. 2 is a side elevational view of the bicycle frame according to the invention.

In the preferred embodiment, flexible bicycle 10 has a frame 11 that is divided into a separate rear frame member 20 and front frame member 30, wherein the center post 22 of rear frame 20 includes integral stiffening means 26 and the crossbar means 34 and 35 of front frame 30 include integral stiffening means 39a and 39b (FIGS. 1 and 2). Front and rear frame members 30, 20 are interconnected at their top by a flexible spring plate assembly 40. A forward portion of front frame member 30 is biased downwardly by a tension cable 14 attached to an anchor plate 33 on front frame member 30 and tensioned by a compression spring 16 mounted at a lower portion of rear frame member 20.

This construction is especially well adapted to dirt bike racing in that the front and rear frame members are allowed limited pivotal motion with respect to each other about spring plate assembly 40 and shock force, exerted on either the front or rear wheels, is transferred to compression spring 16 through tension cables 14. Thus, when a bump is encountered by front wheel 38, the front frame member 30 will pivot counterclockwise about spring assembly 40 causing compression spring 16 to compress. After the bump, the force stored in spring 16 will be dissipated as the spring relaxes. It has also been observed, that the flexible bicycle enhances the performance of a racer, by storing energy in compression spring 16 during the power stroke portion of the pedal rotation. This energy is released through the racer acting upon the pedals during the low-power portion of the pedal rotation. Yet, the problem of yaw between front and rear frames 30 and 40 is minimized, surprisingly even without using a bulky spring plate assembly 40.

Front frame member 30 has a substantially vertically extending front journal tube 36 for journaling a front wheel frame or fork member 15, and the wheel and handlebars attached to the fork member 15. A horizontal crossbar assembly 32 extends generally horizontally rearwardly from front journal tube 36 and terminates in a portion connected to the spring plate assembly 40. Horizontal crossbar assembly 32 comprises an upper crossbar member 34 and a lower crossbar member 35, both rigidly attached to journal tube 36 at a front portion thereof and converging into rigid engagement at their rear portion. An anchor plate 33 attached to horizontal crossbar 32 provides an attachment for one end of tension cable 14.

Rear frame member 20 comprises a substantially vertical center post 22 that telescopingly receives a seat post 12 at an upper portion thereof. A crank shaft hub 24 at a lower portion of vertical center post 22 journals the pedal crankshaft (not shown). A pair of rearwardly extending connecting members 28a and 28b interconnect the rear wheel with the vertical center post 22.

Figure 3:
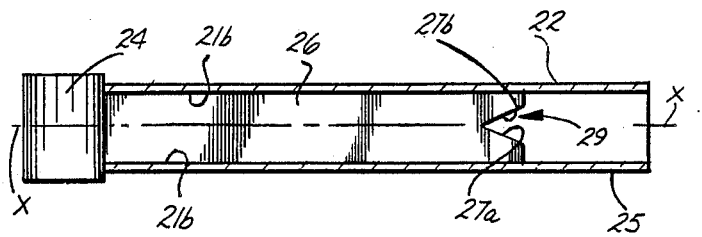
FIG. 3 is a front sectional elevational view taken along the lines III—III of FIG. 2.

Surprisingly, the forces exerted on rear frame member 20 have a tendency to cause the vertical center post 22 to deflect laterally (left and right as viewed in FIG. 3.) and to twist longitudinally with respect to a generally vertical, longitudinal plane X—X to a greater degree than they cause flat spring 40 to twist or flex laterally. To resist this lateral bending and twisting force, stiffening means are integrally included in vertical center post 22. In the preferred, illustrated embodiment, center post 22 is a hollow tubular member having opposing wall portions 21a, 21b and the stiffening means comprises rigid plate 26 integrally assembled within the vertical center post 22 transverse plane X—X. Plate 26 is an elongated plate with a width sized to create an interference fit with opposing wall portions 21a, 21b that define the internal diameter of vertical center post 22. Rigid plate 26 extends in vertical center post 22 from crankshaft hub 24 for a distance approximately 75% of the vertical height of the center post 22. The upper, unoccupied, portion of center post 22 telescopingly receives the seat post 12. Spot welds 50 rigidly secure plate 26 to center post 22.

A pair of upwardly diverging edges 27a, 27b at an upper portion 23 of plate 26 provide a V-shaped notch 29 about 2-3 inches long in upper portion 23. The purpose of this notch, is to provide lateral compression means for allowing the upper portion 23 to laterally compress. This is provided to reduce a localized concentration of stress in center post 22 at the terminal portion of the plate.

Similarly, the forces exerted on front frame member 30 have a tendency to cause bending and torsion forces in the crossbar 32 with respect to generally vertically longitudinal plane X—X (FIG. 4) which has a tendency to cause upper and lower crossbar members 34, 35 to reflect laterally and to twist longitudinally with respect to the generally vertical, longitudinal plane X—X (FIG. 4), again, surprisingly to a greater degree than they cause twisting and lateral flex in flat spring 40. To resolve this problem, integral stiffening means are included in the horizontal crossbar 32 in general and in the upper and lower crossbar members 34 and 35 specifically. In the preferred, illustrated embodiment, crossbar members 34, 35 are hollow tubular members having opposing wall portions 42a, 42b and the integral stiffening means, included with the horizontal crossbar, includes a rigid plate 39a in upper crossbar member 34 and rigid plate 39b in lower crossbar member 35 transverse plane X—X. Each rigid plate 39a, 39b is interference fit and welded in place between opposing wall portions 42a, 42b and extends rearwardly from the front journal tube 36 the majority of the length to a rearward portion 31a, 31b of its respective crossbar member. The crossbar members 34 and 35 become laterally wider and vertically flatter in their respective rearward portions 31a, 31b. This lateral widening of the crossbar members at their rearward portions provides integral stiffening means in the rearward portion so the respective plates 39a, 39b terminate forward of this rearward portion. Further, if plates 39a, 39b extended fully through crossbar members 34, 35 these uniformly-dimensioned plates would not engage the walls of the rearward portion.

A pair of rearwardly diverging edges 37a and 37b provide a V-shaped notch 38 about 2-3 inches long at a rearward portion of each rigid plate 39a and 39b. The purpose of notches 38 are to prevent a buildup of localized stress in the walls of crossbar members 34 and 35 at the point where the rigid plates 39a and 39b terminate. Notches 38 provide compression means to allow the rigid plates 39a and 39b to laterally compress at their rearward terminal end.

Figure 5:
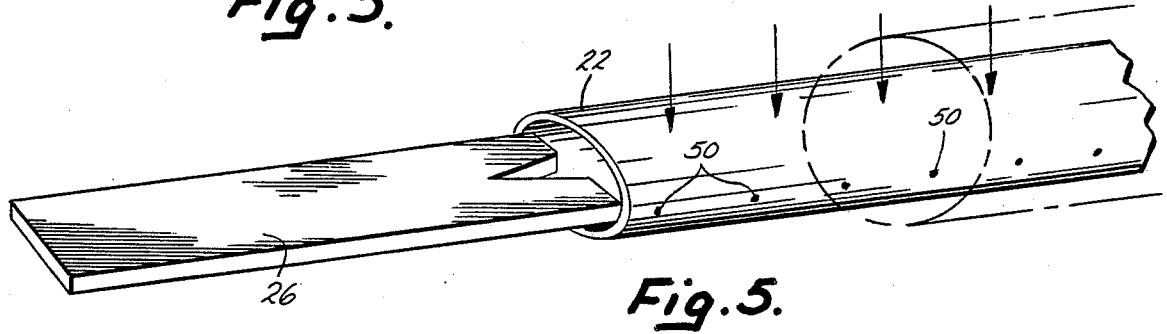
FIG. 5 is a perspective view showing a method of inserting a rigid plate into the vertical center post.
Figure 6:
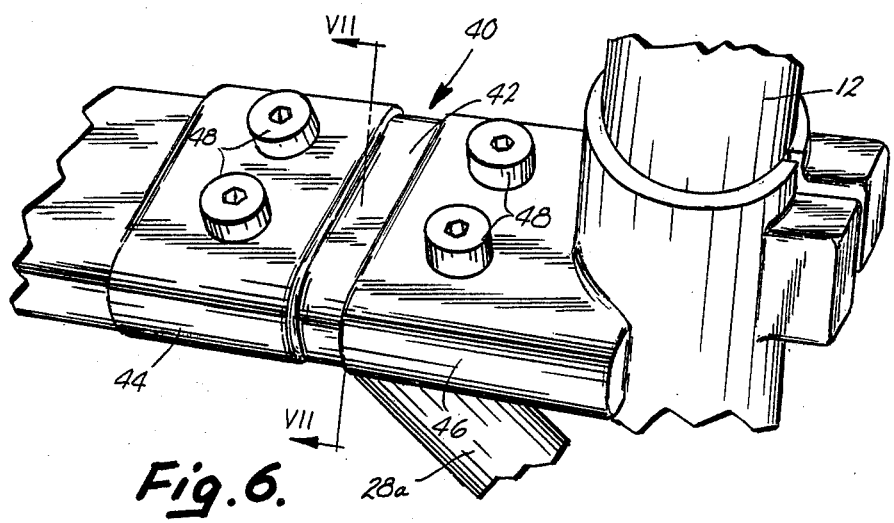
FIG. 6 is an enlarged cutaway perspective view of the portion indicated by VI in FIG. 2.

FIG. 5 illustrates how a rigid plate 26 is inserted, with an interference fit, into vertical center post 22. Prior to the attachment of crankshaft hub 24 to a lower portion of center post 22, a lateral compression force is applied uniformly along the longitudinal extent of the center post. This compression force deforms the center post within its elastic deformation limit, into an elongated, elliptical cross section. The major axes of the ellipse is greater than the width of rigid plate 26. Thus, plate 26 may be inserted into center post 22 and, when the compression force is relieved, the center post 22 will resume its circular cross-sectional configuration and will firmly engage the rigid plate 26, which is slightly wider than the I.D. of center post 22, in an interference fit. A plurality of spot welds 50 are spaced along the interface between the center post 22 and the rigid plate 26. Welds 50 are preferably made by tungsten-inert-gas welding techniques (TIG). The same process is utilized to insert rigid plate 39a into upper crossbar member 34 and rigid plate 39b into lower crossbar member 35. After the compression force is exerted onto the crossbar members 34, 35, the respective rigid plate 39a, 39b is inserted into the crossbar member from the end that is subsequently attached to the front journal tube 36.

Spring plate assembly 40 comprises a spring plate 42 that is attached at one end thereof to front frame member 30 by a front fitting 44 at the opposite end thereof to rear frame member 20 by a rear fitting 46. A plurality of clamping screws 48 frictionally retain the spring plate 42 in its respective front and rear fittings 44 and 46.

Figure 7:
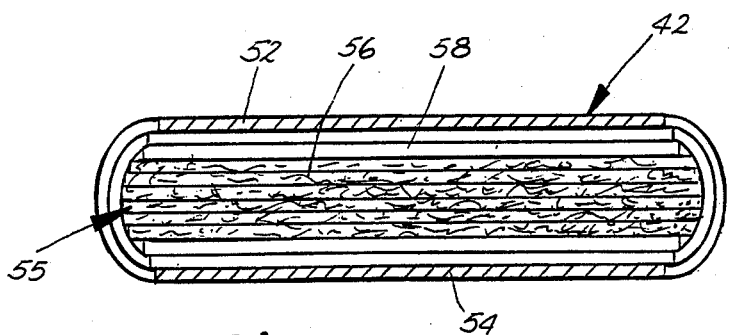
FIG. 7 is a cross-sectional view taken along the lines VII—VII in FIG. 6.

Referring to FIG. 7, spring plate 42 is a laminate construction comprising a top plate 52, a bottom plate 54 and a laminate core 55 between the top and bottom plates. The top and bottom plates 52, 54 are made from spring steel that, in the most preferred embodiment, is 42 mils in thickness. Core 55 is manufactured from multiple parallel layers 56 of a fiberglass mat bonded together by a polyester resin. A double layer 58 of a polymeric material is bonded to each side of the fiberglass laminate between the core and its respective plate 52, 54. The polymeric layer 47 may be applied by making two wraps of a polymeric sheet transverse the longitudinal axis of the spring plate. A polymeric material suitable for this application is manufactured under the brand KEVLAR 49 by DuPont.

An alternative embodiment of one aspect of the invention is shown in FIGS. 8 an 9. Crossbar 132 is formed as an essentially continuous, integral skin comprising successively connected wall portions including a top portion 60, a side portion 62, a bottom portion 61, and a second side portion 62. Wall portions 60-62 are successively interconnected so as to form a box-beam. The skin is reenforced at a longitudinally central portion by a crossbrace 63 extending vertically between top and bottom portions 60 and 61 and horizontally between side portions 62. A diagonal brace 64 at a front portion of the crossbar 132, extends from an upward forward end of the crossbar 132 adjacent the journal tube 136 downwardly, rearwardly to an anchor plate 133. Diagonal brace 64 distributes a load placed on the crossbar 132, from tension cable 114, to the front journal tube 136.

The box-beam construction of horizontal crossbar 132 provides integral stiffening means for the horizontal crossbar to resist torsional and lateral forces exerted on the front frame member 30.

In the illustrated embodiment, anchor plates 33, 39a and 39b are constructed from 60 mil thick chrome-molybdenum steel plate. Center post 22 and crossbar members 34 and 35 are constructed of 35 mil thick chrome-moly steel tubing. However, the invention lends itself to implementation by other materials.

Changes and modifications in the specifically described embodiments can be carried out without departing from the scope of the invention. For example, integral stiffening means may be provided for front and rear frame members by externally mounted stiffening plates. The invention, although capable of implementation in many forms, is intended to be limited only by the scope of the appended claims and all equivalents to which we are entitled as a matter of law.

The embodiments of the invention in which an exclusive property or privilege is claimed are defined as follows:

1. A bicycle having a frame, a pair of wheels supporting said frame and a pedal crankshaft journaled to said frame for manually propelling one of said wheels, said frame comprising:
   a rear frame member including a generally vertical center post positioned within an imaginary, generally vertical plane extending along a longitudinal axis of said bicycle;
   a front frame member including a generally horizontally crossbar means positioned within said generally vertical, longitudinal plane;
   flex means for flexibly interconnecting said frame members so as to allow vertical relative flexing of said frame members generally along said generally vertical, longitudinal plane but so as to minimize relative flexing of said frame members out of said generally vertical, longitudinal plane;
   one of (1) said center post, (2) said crossbar means and (3) both said center post and said crossbar means including integral stiffening means for minimizing twisting and lateral bending of same out of said generally vertical, longitudinal plane.

2. The bicycle in claim 1 in which said center post is a hollow tubular member having opposing wall portions and in which said integral stiffening means comprises a first rigid plate positioned within the interior of said center post transverse said generally vertical, longitudinal plane and interference fit between said opposing wall portions, said rigid plate extending the majority of the length of said center post.

3. The bicycle in claim 2 in which said plate is welded to said wall portions.

4. The bicycle in claim 2 in which said center post has an upper portion for telescopingly receiving a seat post and in which said rigid plate is in a portion of said center post below said upper portion.

5. The bicycle in claim 4 in which said rigid plate has compression means in a portion thereof adjacent said center post upper portion for reducing a concentration of stress in said center post wall portions.

6. A bicycle comprising:
   a rear frame member including a generally vertical center post positioned within an imaginary, generally vertical plane extending along a longitudinal axis of said bicycle;
   a front frame member including a generally horizontal crossbar means positioned within said generally vertical, longitudinal plane;
   flex means for flexibly interconnecting said frame members so as to allow vertical relative flexing of said frame members generally along said generally vertical, longitudinal plane but so as to minimize relative flexing of said frame members out of said generally vertical, longitudinal plane;
   one of (1) said center post, (2) said crossbar means and (3) both said center post and said crossbar means including integral stiffening means for minimizing twisting and lateral bending of same out of said generally vertical, longitudinal plane;
   said center post being a hollow tubular member having opposing wall portions and an upper portion for telescopingly receiving a seat post; and
   said integral stiffening means comprising a first rigid plate positioned within the interior of said center post transverse said generally vertical, longitudinal plane and interference fit between said opposing wall portions, said rigid plate extending the majority of the length of said center post, said rigid plate being located in a portions of said center post below said upper portion, said rigid plate having compression means in a portion thereof adjacent said center post upper portion for reducing a concentration of stress in said center post wall portions, said compression means comprising diverging edge means defining a V-shaped notch in an end of said plate.

7. A bicycle comprising:
   a rear frame member including a generally vertical center post positioned within an imaginary, generally vertical plane extending along a longitudinal axis of said bicycle;
   a front frame member including a generally horizontal crossbar means positioned within said generally vertical, longitudinal plane;
   flex means for flexibly interconnecting said frame members so as to allow vertical relative flexing of said frame members generally along said generally vertical, longitudinal plane but so as to minimize relative flexing of said frame members out of said generally vertical, longitudinal plane;
   one of (1) said center post, (2) said crossbar means and (3) both said center post add said crossbar means including integral stiffening means for minimizing twisting and lateral bending of same out of said generally vertical, longitudinal plane; and said crossbar means including upper and lower crossbar members, each said crossbar member comprising a hollow tubular member having opposing wall portions and in which said integral stiffening means comprises a rigid plate positioned within the interior of said upper crossbar member transverse said generally vertical longitudinal plane and interference fit between said upper crossbar wall portions an further comprises a rigid plate positioned within the interior of said lower crossbar member transverse said generally vertical, longitudinal plane and interference fit between said lower crossbar wall portions, each said rigid plate extending the majority of the length of the respective said crossbar member.

8. The bicycle in claim 7 in which said plates are welded to their respective crossbar wall portions.

9. The bicycle in claim 7 in which said cross tubes each have a flattened portion at a rearward end thereof and in which said rigid plates are in a portion of the respective cross tube forward of said flattened portion.

10. The bicycle in claim 9 in which each said rigid plate has a compression means in a portion thereof adjacent the respective cross tube flattened portion for reducing a concentration of stress in the respective said cross tube wall portions.

11. The bicycle in claim 10 in which said compression means comprises diverging edge means defining a V-shaped notch in the respective said plate.

12. The bicycle in claim 1 in which said integral stiffening means comprises said crossbar means having wall means defining a plurality of substantially flat, successively connected wall portions defining a box-beam.

13. The bicycle in claim 12 further having a cross brace extending between opposite said wall portions.

14. The bicycle in claim 1 in which said flex means comprises a spring plate transverse said vertical, longitudinal plane, said spring plate comprising upper and lower plates and a central core between said plates.

15. The bicycle in claim 14 wherein said core comprises an inner portion including a plurality of layers of fiberglass bonded together and an outer portion including a plurality of layers of a polymeric material bonded together.

16. The bicycle in claim 15 in which said layers are bonded together by a polyester resin.

17. A bicycle comprising:
a rear frame member including a generally vertical center post positioned within an imaginary, generally vertical plane extending along a longitudinal axis of said bicycle;
a front frame member including a generally horizontal crossbar means positioned within said generally vertical, longitudinal plane;
flex means for flexibly interconnecting said frame members so as to allow vertical relative flexing of said frame members generally along said generally vertical, longitudinal plane but so as to minimize relative flexing of said frame members out of said generally vertical, longitudinal plane;
one of (1) said center post, (2) said crossbar means and (3) both said center post and said crossbar means including integral stiffening means for minimizing twisting and lateral bending of same out of said generally vertical, longitudinal plane;
said flex means comprising a spring plate transverse said vertical, longitudinal plane;
said spring plate comprising upper and lower plates and central core between said plates; and
said front frame member having a rearwardly opening first fitting member, said rear frame member having a forwardly opening second fitting member and in which said spring plate having a first end in said first fitting member and a second opposite end in said second fitting member.

18. The bicycle in claim 17 further having clamping screw means associated with each said fitting member for clamping each said end of said spring plate in the respective said fitting member.

* * * * *